United States Patent
Yates et al.

(10) Patent No.: US 9,033,245 B2
(45) Date of Patent: May 19, 2015

(54) DEVICE AND METHOD FOR OBFUSCATING VISUAL INFORMATION

(75) Inventors: Howard Yates, Herts (GB); Nigel Backhurst, Leicester (GB)

(73) Assignee: TENTO TECHNOLOGIES LTD., London (GB)

(*) Notice: Subject to any disclaimer, the term of this patent is extended or adjusted under 35 U.S.C. 154(b) by 143 days.

(21) Appl. No.: 13/703,574

(22) PCT Filed: Sep. 17, 2009

(86) PCT No.: PCT/GB2009/002216
§ 371 (c)(1),
(2), (4) Date: Jan. 4, 2013

(87) PCT Pub. No.: WO2011/033246
PCT Pub. Date: Mar. 24, 2011

(65) Prior Publication Data
US 2013/0105582 A1    May 2, 2013

(51) Int. Cl.
*G06K 19/00*    (2006.01)
*G06K 19/10*    (2006.01)
*G09C 5/00*    (2006.01)
*G06K 7/00*    (2006.01)
(Continued)

(52) U.S. Cl.
CPC ............... *G09C 5/00* (2013.01); *H04L 2209/04* (2013.01)

(58) Field of Classification Search
CPC ......... G09C 5/00; H04N 1/448; G02B 27/144
USPC ............ 235/435, 439, 454, 487, 488; 283/17, 283/73; 359/618; 380/54, 243
See application file for complete search history.

(56) References Cited

U.S. PATENT DOCUMENTS 3,234,663 A * 2/1966 Ferris et al. ............... 380/54
3,279,095 A * 10/1966 Carlson ............... 380/54
(Continued)

FOREIGN PATENT DOCUMENTS

EP    0 260 815    3/1988
EP    0260815    3/1988
(Continued)

OTHER PUBLICATIONS

International Search Report for PCT/GB2009/002216, mailed Mar. 18, 2011.
(Continued)

*Primary Examiner* — Thien M Le
*Assistant Examiner* — Claude J Brown
(74) *Attorney, Agent, or Firm* — Nixon & Vanderhye P.C.

(57) ABSTRACT

A device is described for the hiding and subsequent recovery of visual information. The device comprises two or more tokens (1), each containing a mask (2,3) of coloured pixels (4), are overlaid (5), so that when the pixels are aligned, hidden information, invisible in the individual tokens. The hidden information consists of one or more recognisable alphabetic, numerical or pictorial characters (6). During token overlay and alignment, the information becomes recognisable because it is made up of pixels whose colour is differentiated from the other pixels in the overlay. The information is hidden by adding pixels of certain colours. When the tokens are overlaid and the pixels aligned, the added pixels are effectively subtracted, revealing the hidden information. The tokens may be printed on various media, or may be displayed on an electronic device.

21 Claims, 4 Drawing Sheets

(51) Int. Cl.
*G06K 7/10* (2006.01)
*G06K 7/14* (2006.01)

(56) References Cited

U.S. PATENT DOCUMENTS

| | | | |
|---|---|---|---|
| 3,914,877 A * | 10/1975 | Hines | 380/54 |
| 3,969,830 A | 7/1976 | Grasham | |
| 4,586,711 A * | 5/1986 | Winters et al. | 273/138.1 |
| 6,728,376 B1 * | 4/2004 | Dean et al. | 380/54 |
| 8,150,034 B2 * | 4/2012 | Hogl | 380/208 |
| 2004/0170275 A1 * | 9/2004 | Lee et al. | 380/54 |
| 2005/0117748 A1 * | 6/2005 | Schrijen et al. | 380/200 |
| 2006/0022059 A1 * | 2/2006 | Juds | 235/494 |
| 2009/0046856 A1 | 2/2009 | Mitchell | |
| 2009/0052666 A1 * | 2/2009 | Rozado | 380/54 |
| 2009/0268904 A1 * | 10/2009 | Verhulst et al. | 380/54 |
| 2009/0277968 A1 * | 11/2009 | Walker | 235/494 |
| 2010/0138912 A1 * | 6/2010 | Bauchot et al. | 726/16 |
| 2010/0314861 A1 * | 12/2010 | Amidror et al. | 283/85 |

FOREIGN PATENT DOCUMENTS

| | | |
|---|---|---|
| GB | 2 172 850 | 10/1986 |
| GB | 2282563 | 4/1995 |
| GB | 2 289 973 | 12/1995 |
| WO | WO 03005634 A1 * | 1/2003 |

OTHER PUBLICATIONS

Written Opinion for PCT/GB2009/002216, mailed Mar. 18, 2011.
International Preliminary Report on Patentability for PCT/GB2009/002216, issued Mar. 20, 2012.
Third Party Observation issued in United Kingdom Application No. 0806249.9 dated Jun. 24, 2011.

* cited by examiner

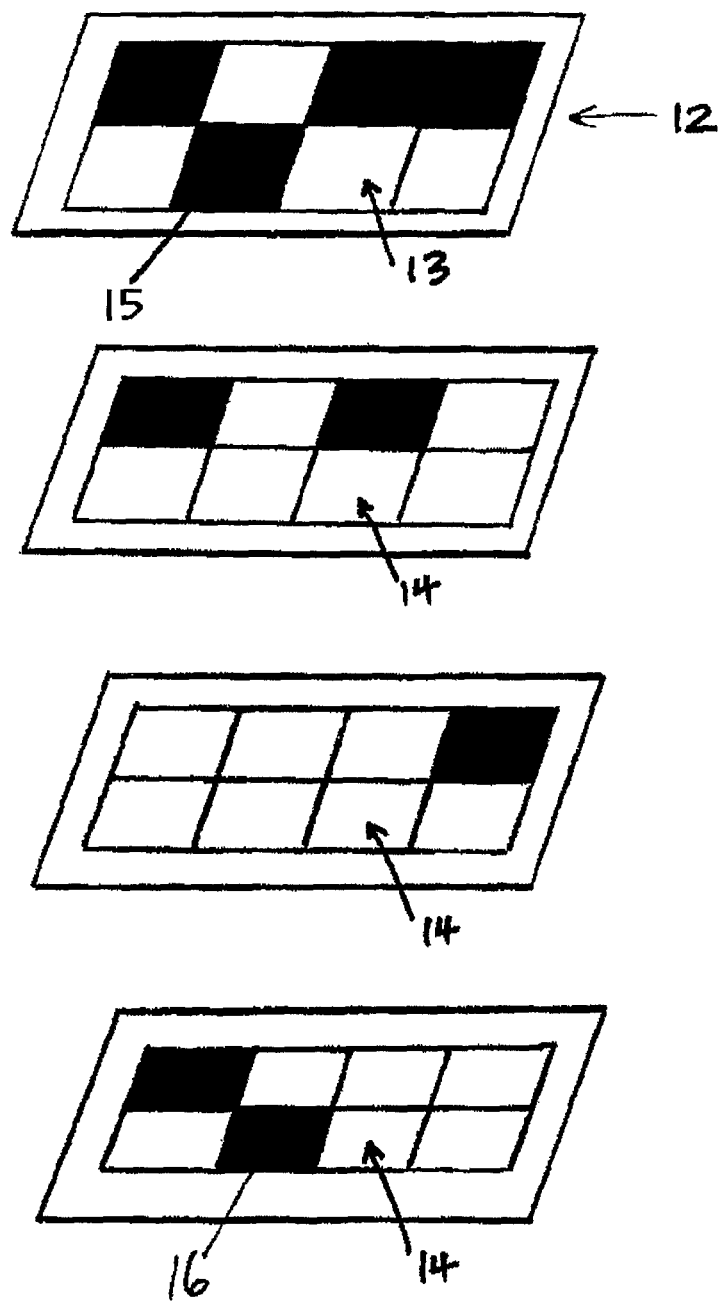

DEVICE AND METHOD FOR OBFUSCATING VISUAL INFORMATION

This application is the U.S. national phase of International Application No. PCT/GB2009/002216 filed 17 Sep. 2009 which designated the U.S., the entire contents of which is hereby incorporated by reference.

The present invention relates to a device and method for revealing a hidden image, specifically, but not exclusively, for revealing a hidden password or pin code.

The use of personal identification (PIN) numbers with bank and credit cards is known. However, PIN numbers are easily lost, stolen or copied. As a consequence, further levels of identification security have been developed, such as the use of biometric data.

In the past, translucent cards with printed patterns have been used to reveal hidden information, such as to reveal the winner of a prize in a magazine for example. One prior art method of using translucent cards for secure user identification comprises filters printed on cards in black and transparent block patterns to "pick-out" or reveal particular letters and/or numbers from an apparently random "sea" of letters and numbers. This revealed "code" then being used to gain entry to secure area, such as a bank account, for example. However, the original code is at all times displayed, even if it is mixed in among many other numbers and letters and as such, these systems cannot be used for many applications where higher levels of security are required.

Another prior art method of hiding and revealing visual information uses a process by which an information set (in a form that can be broken down into discrete units of information called pixels) is hidden by adding "noise" units into the background pixels until a point is reached where the original information set can no longer be distinguished. Revealing the original information set uses the reverse process, by which the previously added "noise" is removed from the background by covering over with additional foreground pixels until the original information set is restored.

However in such prior art methods this "additive revealing" of pixels produces a speckled background, consisting of pixels in both background and foreground colours. It can be difficult to read the information against such a background, especially in conditions of low light, or where exact alignment of the base surface and mask cannot be assured. The only way to improve readability is to reduce the pixel size to such a point that the background takes on a grey, rather than speckled, appearance. At such a pixel size, manual alignment of the elements becomes so difficult, as to be effectively impossible.

The present invention therefore seeks to provide a method and device for revealing a hidden image, which overcomes, or at least reduces some of the above-mentioned problems of the prior art.

Accordingly, in a first aspect, the invention provides a device for revealing a hidden image, the device comprising a first mask, onto which is printed a pre-determined pattern of coloured pixels; a second mask, said second mask also being printed with a predetermined pattern of coloured pixels; wherein when said first mask is properly aligned and laid over said second mask, then the image is revealed and comprises a set of pixels in a first colour, characterized in that the image is not visible or recognisable in either of the first and second masks and the first colour is lighter than a second colour of the set of pixels surrounding the image.

This approach has the advantage that the background colours in the overlay are revealed as a solid block of colours. As a result, the overlay is easier to read and process than the speckled background produced by prior art systems.

Preferably further comprising at least a third mask, wherein the third mask may be printed with a predetermined pattern of coloured pixels, wherein said first and third masks are properly aligned and laid over said second mask, then the image is revealed.

Further preferably wherein the pattern of pixels on each mask may be different, and/or wherein the pixels on each mask may be coloured using more than one colour.

Preferably wherein the image may be revealed in a colour which is a foreground colour, said foreground colour being of a lighter colour than the second set of pixels surrounding said foreground pixels, which are in a background colour.

Further preferably wherein the hiding of the image on the masks may be achieved by adding pixels of predetermined colours and shapes, including the colour of said foreground pixels, to a mask comprising said foreground pixels with no background colour until the human eye is no longer able to discern said image.

According to a second aspect, the invention provides a an optical device to obfuscate and reveal images comprising one or more counter masks, made of transparent material, onto which are printed different pre-determined patterns of coloured pixels such that when said counter masks are properly aligned and laid over a base mask made of an opaque material, said base mask also being printed with a predetermined pattern of coloured pixels then a key image is revealed in foreground pixels, recognisable to a human eye, said foreground pixels being of a lighter colour than the background pixels surrounding said foreground pixels, the obfuscation apparent on said counter masks and said base mask being achieved by adding pixels of predetermined colours and shapes, including the colour of said foreground pixels, to a mask comprising said foreground pixels with no background colour until the human eye is no longer able to discern said key image.

The following preferable features are in accordance with both the first and second aspects.

Preferably, wherein the first mask and at least the third masks may be made from transparent material. Further preferably, wherein the second mask may be made from opaque material.

Also preferably wherein said second mask may appear on the visual display screen of an electronic device and/or wherein said masks may contain items printed in non-obfuscated text outside the areas occupied by said masks.

According to a third aspect, the invention provides a method of manufacturing a device for revealing a hidden image, comprising: producing a master mask that contains the image; pixelating this master mask; printing a pattern of coloured pixels onto at least two sub masks such that the pixilated image of the master mask is divided across the at least two sub masks, such that when one sub mask is properly aligned and laid over a second sub mask, then said image is revealed, characterized in that the image is not visible in any of the sub masks and the colour of the image is lighter than a colour used to surround the image.

Preferably, further comprising dividing the result into more than two sub masks and/or wherein the pattern of pixels on each of the sub masks is different.

Further preferably wherein the pixels on each of the sub masks may be colored using more than one colour.

Also preferably wherein the image may be revealed in foreground pixels, said foreground pixels being of a lighter colour than background pixels surrounding said foreground pixels.

Preferably wherein approximately 50% of a sub mask area may be set to a foreground colour or a complementary colour of a foreground colour when used in monochrome.

Further preferably, wherein a background colour pixels in a sub mask are set to a complementary colour of the background colour when used in polychrome.

Preferably wherein the master mask is produced either by computer software or by a mechanical, electro-mechanical or photographic process.

Preferably wherein at least one sub mask may be made from transparent material and/or may be made from opaque material.

Further preferably, wherein the sub masks may contain items printed in non-obfuscated text outside the areas occupied by said sub masks.

A device or method according to any of the preceding aspects, wherein preferably, the image comprises alphanumeric characters or symbols. Further, wherein the characters or symbols may be offset one to another either horizontally or vertically.

Four embodiments of the invention will now be more fully described, by way of example, with reference to the drawings, of which:

FIG. 4 is a diagram showing how pixelated masks are created from a master mask, according to a fourth embodiment of the present invention.

The device and method of the present invention enables the hiding and subsequent recovery of visual information. It has applications in identity authentication, transaction security, password management, product promotion and other fields. For example, it could be used to hide (and reveal) personal PIN numbers or passwords, providing a more secure medium than plain text, whilst helping users to recall such numbers easily, quickly and safely.

Figure 1:
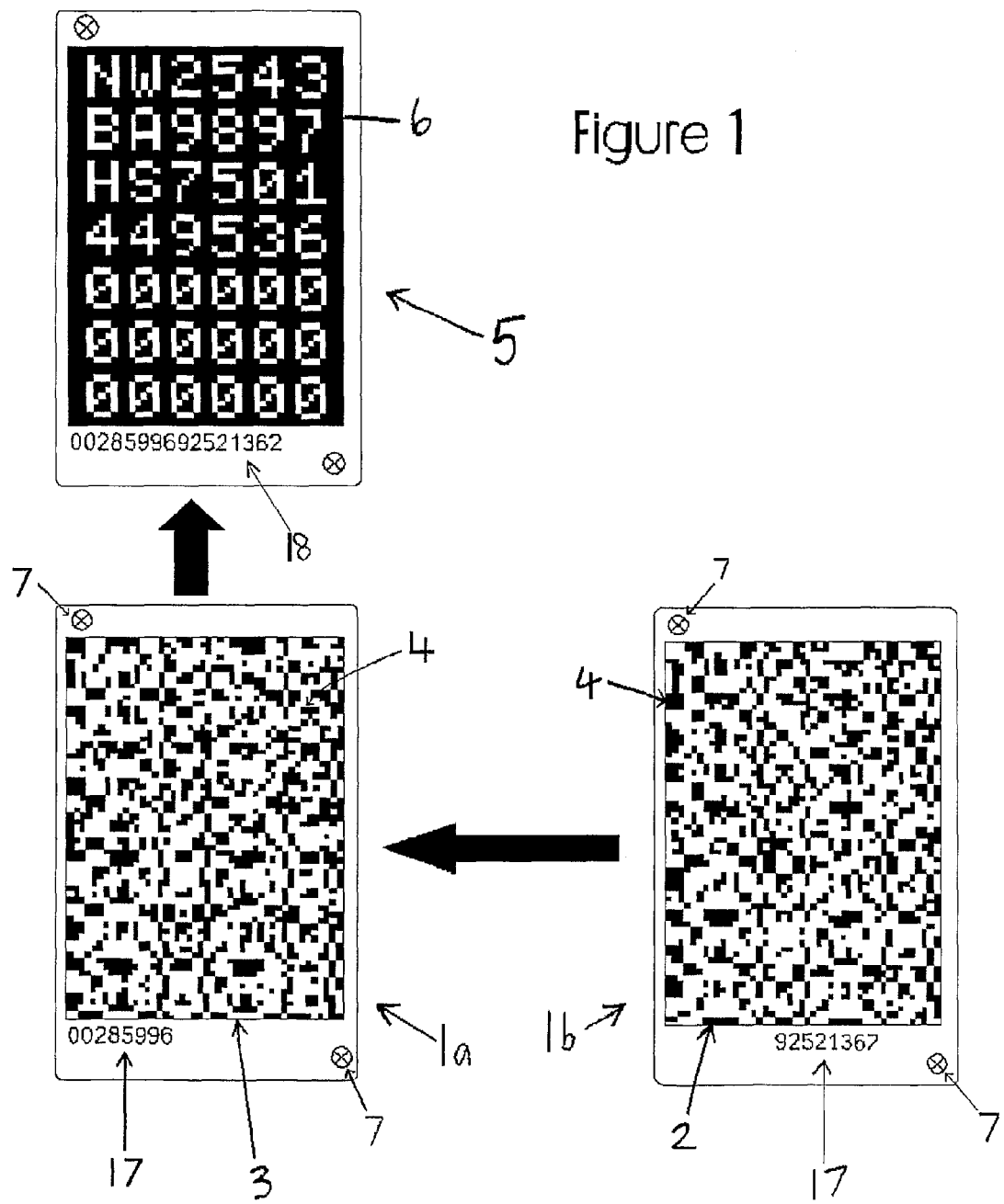
FIG. 1 is a diagram showing two monochrome tokens and their resulting overlay, according to one embodiment of the present invention.

In a brief overview of one embodiment of the present invention, there is shown in FIG. 1a device which comprises a token set 1, which comprises two tokens 1a, 1b, wherein each token 1a, 1b includes a pixelated mask area 2, 3.

Each mask 2, 3 comprises of a number of pixels 4 that have been set to specific colours. When the masks 2, 3 are overlaid, they create an overlay 5. When the pixels 4 are correctly aligned, hidden information, called the key 6, which is not visible (recognisable to the human eye) in any of the individual masks, is revealed. This is so long as the masks 2, 3 belong to the same token set 1. If they do not, the resulting overlay 5 is illegible.

The token set 1 comprises a single "base mask" 2 and one or more "counter masks" 3. The base mask 2 may be printed on a transparent or non-transparent material, or displayed on a computer screen or electronic display device, for example. The counter masks 3 are printed on a transparent material, or in a form that is capable of becoming transparent.

On each token 1 there are alignment guides 7, which may be visible or mechanical. These help to bring the pixels 4 into alignment when the tokens 1a and 1b are overlaid.

The key 6 comprises one or more characters. These characters may be alphabetic, numerical, symbolic, pictorial or any other visually identifiable graphic—it is only necessary that they can be recognised by the human eye and brain.

The area on the tokens 1a, 1b outside the pixelated mask area 2, 3 may be used to hold additional information and security features. For example, where a higher level of security is required, a verification key 17, in plain text, can be split between the base mask 2 and the counter masks 3. The full verification key 18 is only visible (recognisable) when all the masks 2, 3 are overlaid.

Figure 2:
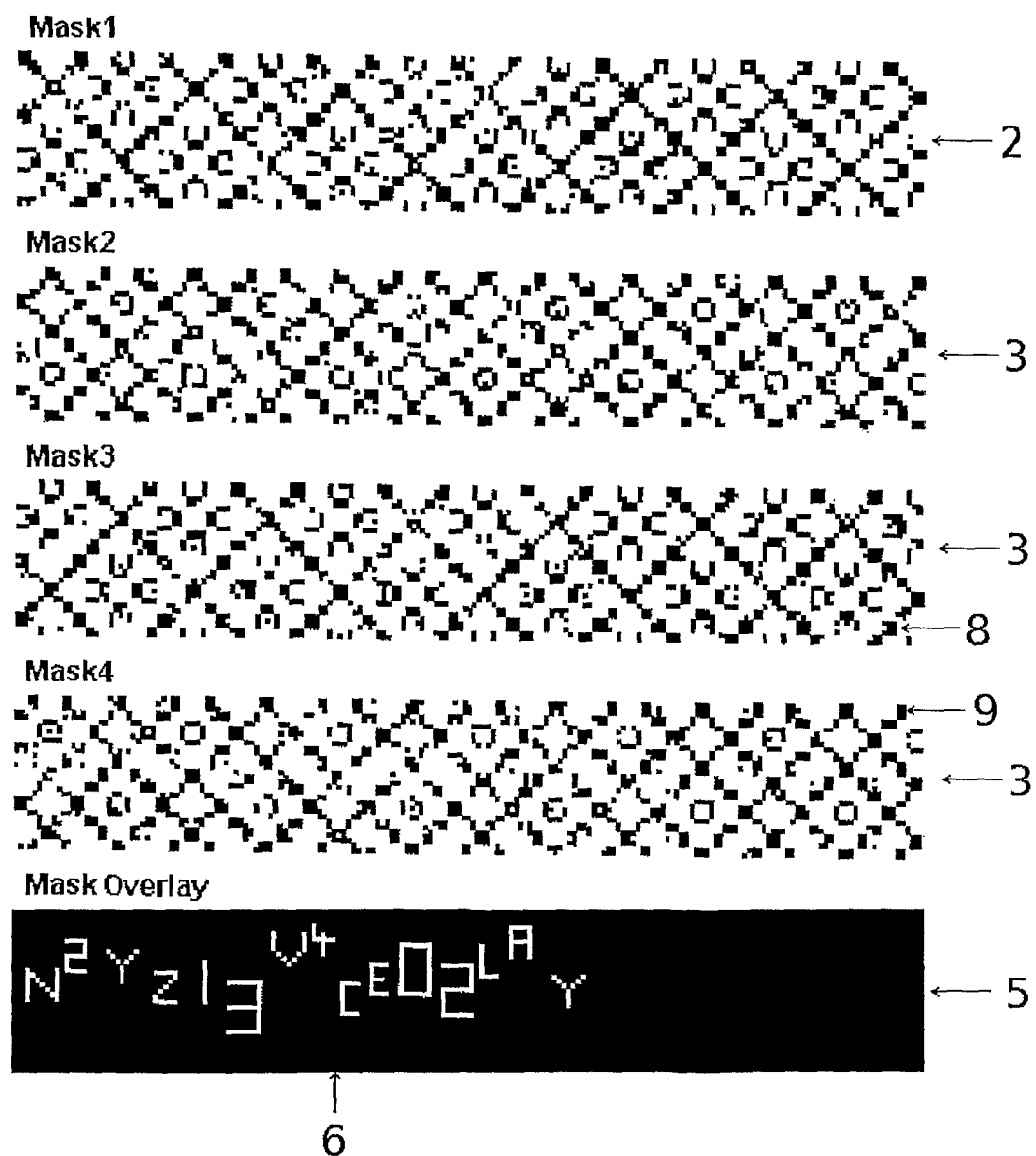
FIG. 2 is a diagram showing 4 masks and the resulting overlay, according to a second embodiment of the present invention.

FIG. 2 is a diagram showing 4 masks and the resulting overlay, according to a second embodiment of the present invention. The counter masks 3 are precisely laid over the base mask 2, as previously described. During the alignment process, the key 6 becomes visible because it is made up of foreground pixels 8 whose colour is differentiated from all the other background pixels 9 in the overlay 5. The shape, size, position and colour of the pixels 8,9 in each mask 2, 3 may be calculated using automated rule sets (please see the description of FIG. 4 for further details). Because a rule set can be repeated, masks can be reproduced accurately. Certain applications require this reproducibility.

The position of each character in the key 6 revealed in the overlay 5 may be offset from the central position both vertically and horizontally.

The key 6 is hidden by a process of pixel overloading (described below). When the masks 2, 3 are overlaid and the pixels 4 aligned, the added pixels are effectively "subtracted", allowing the hidden key 6 to become recognisable.

This pixel overloading is achieved by using a process by which an information set (in a pixelated form) is hidden by adding "noise" units until a point is reached where the original information set can no longer be distinguished. In the present invention, the information set is the matrix of coloured or transparent pixels, arranged so as to display characters that are recognisable to the human eye/brain. The encoding process used by the present invention adds lighter coloured or transparent pixels to the background until the foreground characters are no longer recognisable.

The revealing of the information uses the reverse process by which the previously added "noise" is removed from the background until the original information set is restored. In the present invention, the transparent (or lighter coloured) "noise" pixels are removed (subtracted) from the background when the complementary mask is overlaid, making the foreground information recognisable once more.

This approach has the advantage that the background colours in the overlay 5 are revealed as a solid block of colours. As a result, the overlay 5 is easier to read and process than the speckled background produced by some prior art systems.

Figure 3:
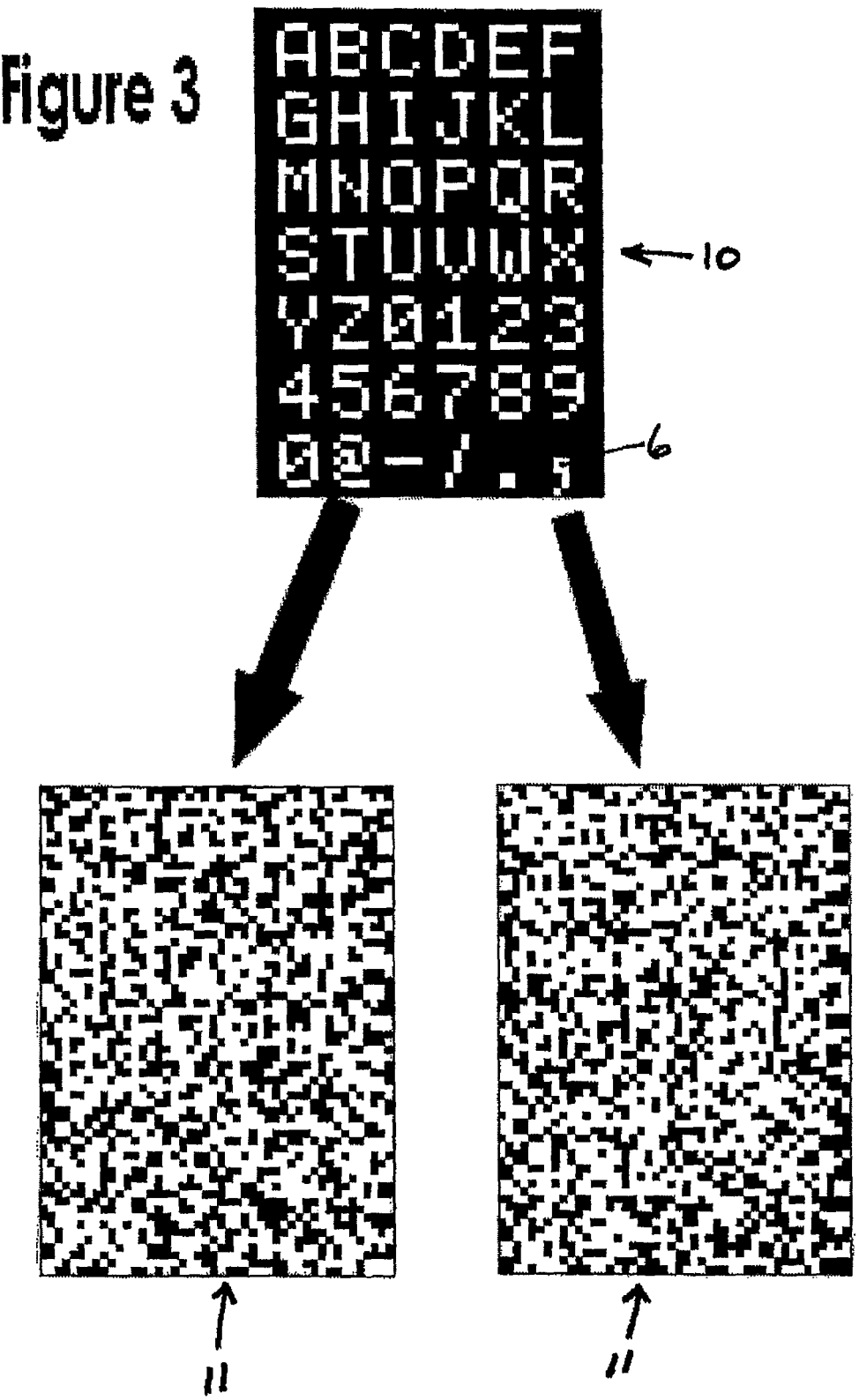
FIG. 3 is a diagram showing a master mask and its division into 2 pixelated masks, according to a third embodiment of the present invention.

FIG. 3 is a diagram showing a master mask and its division into 2 pixelated masks, according to a third embodiment of the present invention. To generate the masks 2, 3 previously described, a master mask 10 is first produced, either by computer software or by mechanical, electro-mechanical or photographic process that contains the required key 6. This is then pixelated and the result is divided into a number of sub-masks 11.

Pixels 4 may be of any size and shape or combination of shapes subject to the following constraints:
 a) The resolution of the pixels must be fine enough to enable the clear rendering of the key when the masks are overlaid.
 b) The shapes selected for the pixels must be capable of forming a "complete tiling" when the masks are overlaid (that is, it should be possible to cover the complete area of the mask with pixels without any gaps or spaces being present).

Using an appropriate rule set, base masks 11 are generated from the master mask 10, in which about 50% of the base mask pixels are set to lighter colours than the remaining base mask pixels. The rule set ensures that, when the base masks are overlaid, the contrast between the resulting foreground and background colours is sufficient for the revealed key 6 to be clearly delineated and recognised by a human eye.

The exact rule set to be used is dependent on:
a) The number of counter masks generated;
b) The sizes and shapes of the pixels;
c) Security requirements such as the size of the character set; and
d) The form of the colour coding used (monochrome or polychrome).

Variations of the rule set are then applied to generate the counter masks 3. An example is described with reference to FIG. 4 following.

FIG. 4 is a diagram showing how pixelated masks are created from a master mask, according to a fourth embodiment of the present invention. There is shown a master token mask 12, which comprises pixels 14, 16 which are of two different colours 13, 15.

In monochrome usage, if a pixel on the master token mask 12 has a foreground colour 13, the corresponding pixel 14 must be set to the same foreground colour (or transparent) in all of the counter masks. If a pixel on the master token mask has a background colour 15, then the corresponding pixel 16 must be set to the background colour 15 in at least one of the counter masks.

In polychrome usage (not shown), if a pixel on the master token mask has a foreground colour, the corresponding pixel must be set to a complementary colour (or transparent) on the counter masks, with at least one counter mask having a complementary colour. If a pixel on the master token mask has a background colour, then the corresponding pixel must be set to a complementary colour in at least one of the counter masks.

The tokens may be printed on paper, transparent film, plastic or various other media, or they may appear on an electronic display device (such as a computer monitor or a mobile phone screen), or any combination of such media, according to the needs of the specific application.

The present invention allows the use of "false positives", which may be used to provide a higher level of security. False positives are characters inserted into one or more of the base or counter masks (but not all of them). Inspection of a single mask might lead one to conclude that the character would appear in the hidden key. However, because they do not appear in all the masks, they remain obfuscated when all the masks are overlaid.

As previously explained, the prior art use of additive revelation produces a speckled background, consisting of pixels in both background and foreground colours. It can be difficult to read the information against such a background, especially in conditions of low light, or where exact alignment of the masks cannot be assured. The only way to improve readability is to reduce the pixel size to such a point that the background takes on a grey, rather than speckled, appearance. At such a pixel size, manual alignment of the elements becomes so difficult as to be effectively impossible. Whereas the device of the present invention uses "additive hiding" and "subtractive revealing" to produce solid blocks of foreground and background colour, facilitating both alignment and readability.

The following differences have been identified between the devices described in the art and the device of the present invention:—
1. In the art, information hiding is done by information "removal". In the device described in this document, it is done by information "overload", as described.
2. In known prior art methods, no mention is made of using more than one overlay. In the device of the present application, it is possible to use multiple overlays; the use of multiple overlays provides a greater level of security and is better suited to particular applications.
3. False positives are not possible with prior art methods.

In the present invention, each card set is capable of displaying millions of different codes, so the security level is sufficient for even the most demanding applications. Another advantage of the present invention is that no electronic readers are required, making it even more cost-effective in deployment. It is envisaged that the present invention could be used in a variety of cases, including:—

Secure delivery of valuable items (eg credit cards and PINs)
Secure delivery to nominated recipients
Secure delivery to recipients in multi-occupancy premises
Traceable and verifiable proof of delivery, whether or not a signature is reliable For example, when two or more parties are engaged in a commercial transaction, each party could be issued with a token, together with any required additional information. When the parties meet to consummate the transaction, they align their tokens to reveal the hidden key and the full additional information, allowing them to verify that the parties to the transaction are genuine. Neither one of the parties has the full image, so no amount of "trial and error" could be used to reveal the key.

Another application may be the obfuscation of an entire document—for example, a last will and testament—where the key would be the content of a page of the document.

Another application relates to helping hospitals to correctly match patients with their records, x-rays, scans, clinical samples, babies, etc which enhances the security of patient authentication and provides benefits over alternative systems, yet at lower cost.

In this case a transparent plastic badge would be worn by the patient, printed with patient details in encrypted form. The details can include the patient's name, registration number and even a password known only to the patient. These details are encrypted using the process described above. The patient is also given the other "half" of his card (containing the complementary image) so they can verify their identity when required. This can be done even when the patient is unconscious.

More importantly, the complementary image can be printed onto peel-off labels which are applied to the entire patient's medical records, clinical samples, scans, etc, uniquely and unambiguously linking them to the patient.

For the patient, the present invention provides the confidence of knowing that neither they, nor their records, can be confused with any other patient. The immediate visibility of the tag means the patient is engaged in a way that is not possible with electronic systems such as barcode readers. For the hospital, the chance of serious errors is greatly reduced whilst also achieving cost reductions in usage, staff training and maintenance.

Another application is in the tracking of assets and authenticating the safe delivery of important or valuable consignments typically rely on a simple signature from the recipient. Although signatures can have legal effect, they are frequently too illegible or ambiguous to be effective in resolving disputes. Recipients often do not wish to commit themselves by supplying a valid signature and sometimes goods are accepted by someone other than the named recipient, leading to difficulties for both parties when disputes arise.

When the cards of the present invention are overlaid on complementary images (for example on a consignment note), a code (key) is revealed which uniquely authenticates the delivery. The cards can be unique to each delivery and the revealed codes may be known or unknown to either recipient or courier, depending on client requirements.

It is also possible to assign a master card to either courier or recipient which can be used as often as required. If lost, stolen or time-expired, master cards can be quickly re-issued and the old card can be disabled.

Another application is the authentication of individual users on the internet and other online systems. The user possesses a transparent plastic card containing an array of characters which have been encoded in the manner of the present invention (the master mask). In order to enter the secure website or to validate a payment or affect any other kind of authentication, a counter-mask is presented to the user on the computer screen. This counter-mask contains a random selection of the characters in the master mask, encoded according to the present invention. The user aligns the master mask with the counter-mask on the screen and the random selection of characters is clearly revealed. The user enters these characters into an input field on the screen and the transaction is thereby authenticated. This application can equally be implemented on a mobile phone or any other electronic device incorporating a visual display.

It will be appreciated that although only one particular embodiment of the invention has been described in detail, various modifications and improvements can be made by a person skilled in the art without departing from the scope of the present invention.

The invention claimed is:

1. An optical device for revealing a hidden image, comprising:
   a mask, onto which is printed a pre-determined pattern of coloured pixels; a base configured to display a pre-determined pattern of coloured pixels; wherein when the mask is properly aligned and laid over the base, then the image is revealed and comprises a set of pixels in a first colour, wherein the image is unrecognizable to the human eye in either of the mask or base due to the mask and/or base being overloaded with noise units such that the noise units are effectively subtracted when the mask is properly aligned and laid over the base and the first colour is lighter than a second colour of pixels surrounding the image, and wherein the image comprises alphanumeric characters or symbols.

2. A device according to claim 1, further comprising at least a second mask, the second mask being printed with a predetermined pattern of coloured pixels, wherein said first and second masks are properly aligned and laid over said base, then the image is revealed.

3. A device according to claim 1, wherein the pattern of pixels on each mask and base is different.

4. A device according to claim 1, wherein the pixels on each mask are coloured using more than one colour.

5. A device according to claim 4, wherein the image is revealed in a colour which is a foreground colour, said foreground colour being of a lighter colour than the second set of pixels surrounding said foreground pixels, which are in a background colour.

6. An optical device as claimed in claim 1 wherein the mask is made of a transparent material.

7. An optical device as claimed in claim 1 wherein the base is an electronic display device.

8. An optical device as claimed in claim 1 wherein the base is made of an opaque material.

9. A device according to claim 1, wherein the characters or symbols are offset one to another either horizontally or vertically.

10. A mask for use with the optical device of claim 1.

11. An optical device for revealing a hidden image of claim 1, wherein the hidden image relates to a password or PIN.

12. A method for manufacturing a device for revealing a hidden image, comprising: producing a master that contains the image; pixelating the master; creating a first and second pre-determined patterns of coloured pixels; printing the first pre-determined pattern of coloured pixels on a mask; and configuring a base to display the second pre-determined pattern of coloured pixels; wherein the pixelated master is divided across the base and mask such that when the mask is properly aligned and laid over the base, then said image is revealed, wherein the image is unrecognizable to the human eye in either the mask or base due to the mask and/or base being overloaded with noise units such that the noise units are effectively subtracted when the mask is properly aligned and laid over the base and the colour of the image is lighter than a colour used to surround the image, and wherein the image comprises alphanumeric characters or symbols.

13. A method according to claim 12, further comprising dividing the result across at least two masks and the base.

14. A method according to claim 12, wherein the pixels on the mask and base are coloured using more than one colour.

15. A method according to claim 14, wherein the image is revealed in foreground pixels, said foreground pixels being of a lighter colour than background pixels surrounding said foreground pixels.

16. A method according to claim 14, wherein approximately 50% of a base is set to a foreground colour or a complementary colour of a foreground colour when used in monochrome.

17. A method according to claim 14, wherein background colour pixels in a mask or base are set to a complementary colour of the background colour when used in polychrome.

18. A method according to claim 12, wherein the master is produced either by computer software or by a mechanical, electromechanical or photographic process.

19. A method of claim 12, wherein one mask is made from transparent material.

20. A method of claim 12, wherein the base is made from opaque material.

21. A method according to claim 12, wherein the characters or symbols are offset one to another either horizontally or vertically.

* * * * *